United States Patent
Takeuchi et al.

[15] 3,646,429
[45] Feb. 29, 1972

[54] NUCLEAR MAGNETIC RESONANCE SPECTROMETER

[72] Inventors: Makoto Takeuchi; Kazuo Nakagawa; Teruo Miyamae; Terubumi Kase, all of Tokyo, Japan

[73] Assignee: Nihon Denshi Kabushiki Kaisha, Tokyo, Japan

[22] Filed: Dec. 29, 1969

[21] Appl. No.: 888,374

[30] Foreign Application Priority Data

Nov. 27, 1969 Japan....................................44/95300

[52] U.S. Cl. ..........................................................324/0.5 R
[51] Int. Cl. ......................................................G01n 27/78
[58] Field of Search..........................324/0.5 A, 0.5 AC, 0.5 G

[56] References Cited

UNITED STATES PATENTS

| | | | |
|---|---|---|---|
| 3,304,492 | 2/1967 | Glarum | 324/0.5 A |
| 3,487,293 | 12/1969 | Toshimasa | 324/0.5 AC |

Primary Examiner—Michael J. Lynch
Attorney—Webb, Burden, Robinson & Webb

[57] ABSTRACT

Method and apparatus for measuring gyromagnetic resonances over the nuclear magnetic resonance spectrum wherein the driving ratio frequency magnetic field or the unidirectional polarizing magnetic field is modulated at two or more different frequencies creating different resonance regions on the spectrum which are observed substantially simultaneously.

6 Claims, 9 Drawing Figures

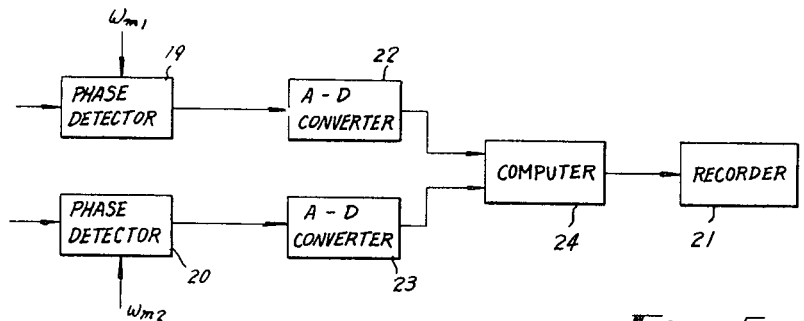
Fig. 6
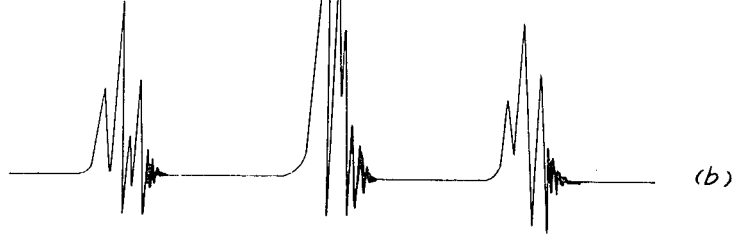
Fig. 7
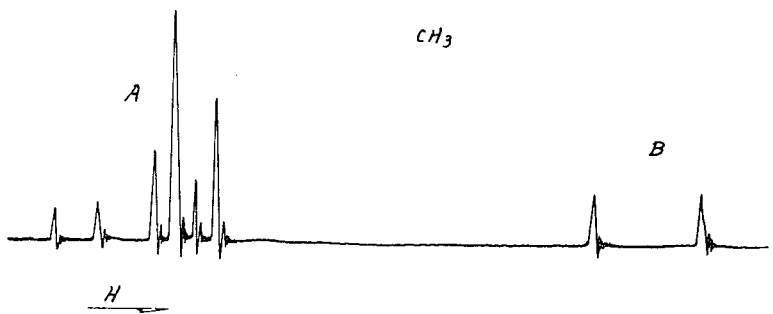
Fig. 9
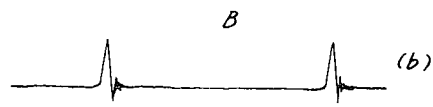

NUCLEAR MAGNETIC RESONANCE SPECTROMETER

In recent years attempts have been made to observe with high resolution the nuclear magnetic resonance spectra of nuclei other than the proton or fluorine nucleus, for example $^{13}C$, $^{29}Si$, $^{15}N$ and $^{11}B$. These nuclei have extremely small natural abundances and, therefore, produce very weak resonance signals.

Among the mentioned nuclei, $^{13}C$ and $^{15}N$ are of special interest in connection with the chemical structure of molecules and chemical reactions, etc. $^{13}C$ has drawn rather special attention due to the wide applicability.

Consider the observation of $_{13}C$ in which all the proton nuclei are decoupled. Although the natural abundance of the $^{13}C$ nucleus is only 1.1 percent and its signal intensity a mere 1.59 percent (approximately) as compared with that of the proton, none the less, good results may be obtained when observing $^{13}C$ signals in the high magnetic field while carrying out complete proton decoupling, due to collapsing the multiplet and the nuclear Overhauser Effect between the protons and $^{13}C$. The line width of the proton decoupled spectrum is extremely narrow and the range of the chemical shift is larger than that of proton by one order. Consequently, the spectra hardly ever overlap.

When the spectrum line is very sharp, however, the magnetic field must be swept very slowly in order to observe the resonance spectra accurately. If, for example, the field is swept rapidly, the spectra will be distorted resulting in their appearing as broad line spectra. At the same time, if the chemical shift is extremely large and the chemical shift region is swept slowly, observation will become quite time consuming.

Generally, when carrying out $^{13}C$ magnetic resonance observation, the computer time averaging technique is utilized to improve S/N (signal to noise) ratio when sweeping the field slowly and thereby improve the reproduction fidelity of the resonance spectrum. However, it takes quite a long time to improve the S/N ratio for the reason that the S/N ratio is proportional to the square root of the number of measurements.

It is true, of course, that the above shortcoming can be overcome by employing two observing systems instead of one. In this case, the two systems are independently arranged so that each system simultaneously observes half the chemical shift range, thus reducing the sweep time by half. In other words, by means of this twin system arrangement, the required S/N ratio can be obtained in half the time necessary for the conventional arrangement, since each output signal is independently and separately accumulated by a computer.

However, the utilization of two systems tends to make the apparatus quite complex, not to mention the added cost of such an apparatus. However, it has been found to be extremely difficult to balance the two systems perfectly due to the slight differences in the operating conditions of the incorporated component parts.

According to this invention, there is provided a novel method and apparatus for reducing the observation time by using a time sharing method. Another feature of this invention is the provision of a novel method and apparatus for enlarging spectra having small magnitude. Still another feature of this invention is the provision of a novel method and apparatus for improving the S/N (signal to noise) ratio by utilizing the noise time averaging method.

Briefly, according to this invention, a high resolution magnetic resonance spectrometer, effective for observing nuclei having extremely small natural abundances, utilizes a time-sharing technique in which two or more different modulating frequencies are applied to the driving radiofrequency magnetic field or the unidirectional polarizing magnetic field to create two different resonance regions on the gyromagnetic spectrum which may be observed substantially simultaneously. According to one embodiment of this invention the two or more modulating frequencies are alternately applied and their respective resonance regions observed during the time of application. According to another embodiment, the two or more modulating frequencies are simultaneously applied and the resonance signals in the respective resonance regions are alternately observed by alternately adding selected local frequencies to the signals such that only the signal from resonance regions passes a filter.

Other features and advantages will become more readily apparent by reading through the following detailed description of the present invention in conjunction with the accompanying drawings in which:

FIG. 6 shows a partially modified embodiment of the present invention;

FIG. 7 shows the spectra obtained by the apparatus according to the present invention;

FIG. 9 shows spectra obtained by using the embodiment according to FIG. 8.

Figure 1:
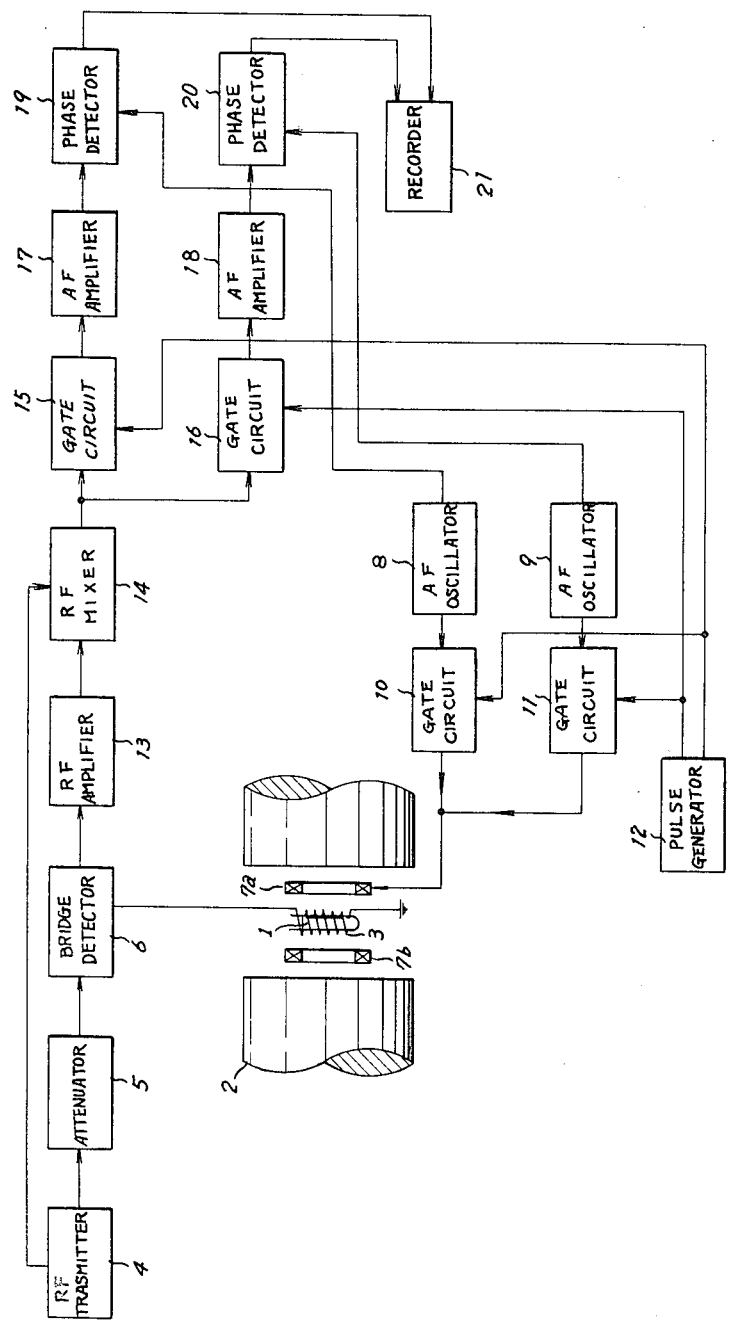
FIG. 1 is a block schematic showing one embodiment of the present invention wherein a magnetic field modulated gyromagnetic apparatus is used.

Referring now to FIG. 1, a test sample 1 is placed in a unidirectional magnetic field produced by an electromagnet 2, the said magnet being excited by an excitation source (not shown).

An RF coil 3 perpendicular to the unidirectional magnetic field supplies a radiofrequency driving magnetic field to the sample 1, the necessary radiofrequency being provided by an RF transmitter 4 via an attenuator 5 and a bridge detector 6.

Figure 2:
FIG. 2 shows the two modulation frequency modes used in the embodiment according to FIG. 1.
Figure 2:
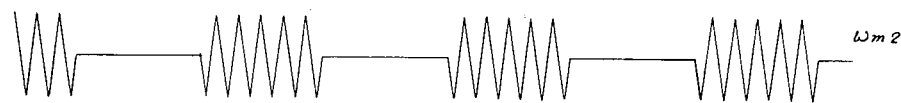

A pair of modulation coils 7a and 7b, arranged coaxially with respect to the unidirectional magnetic field, are alternately supplied with, for example, a 4 kHz. ($\omega_{m1}$) and a 5 kHz. ($\omega_{m2}$), modulating current by means of audiofrequency oscillators 8 and 9 through gate circuits 10 and 11. A pulse generator 12 supplies pulsed outputs to the said gate circuits 10 and 11 and, since the said outputs are in antiphase, the modulation currents ($\omega_{m1}$) and $\omega_{m2}$) are alternately applied to the modulation coils 7a and 7b as shown in FIG. 2.

When the unidirectional magnetic field is swept by means of a sweep coil (not shown), the nuclear magnetic resonance signals $2\pi f_i \pm \omega_{m1}$ and $2\pi f_i \pm \omega_{m2}$ (where $f_i$ is the RF transmitter frequency, for example, 60 mc.) of the sample 1 are produced and fed into an RF amplifier 13 via the bridge detector 6. The amplified resonance signals are then fed into an RF mixer 14 (heterodyne detector) to which the radiofrequency $f_i$ is simultaneously applied from the RF transmitter 4 as a reference signal. As a result, after suitable filtering, output signals having only two components, namely $\omega_{m1}$ and $\omega_{m2}$ are selected. The said output signals are then split and fed into gate circuits 15 and 16 to which pulses from the pulse generator 12 are applied. The gates are adjusted so that when the time shared modulation frequency $\omega_{m1}$ is applied to the coils 7a and 7b the gate circuit 15 is opened and gate 16 is closed; conversely, when the time shared modulation frequency $\omega_{m2}$ is applied to the coils 7a and 7b, gate 16 is opened and gate 15 is closed.

The output signals from the gates are then fed into phase detectors 19 and 20, after being amplified by AF amplifiers 17 and 18, respectively. At the same time, modulation frequencies $\omega_{m1}$ and $\omega_{m2}$ are applied from the audiofrequency oscillators 8 and 9 to the phase detectors 19 and 20, as reference signals, respectively.

Thus, by setting the phase of the reference signal either at 0° or 90° by means of a phase shifter (not shown), either the dispersion mode or absorption mode can be optionally selected and recorded on either a two-pen recorder or two separate one-pen recorders. In this way, the spectra of $^{13}C$, for example, can be obtained.

The operation of the apparatus according to the invention is set forth below in reference to the embodiment diagramed in FIG. 1.

METHOD ONE

Figure 3:
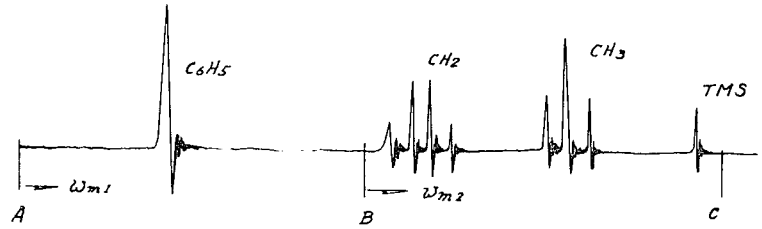
FIGS. 3 and 4 are graphical illustrations of the spectra used for explaining the present invention.
Figure 4:
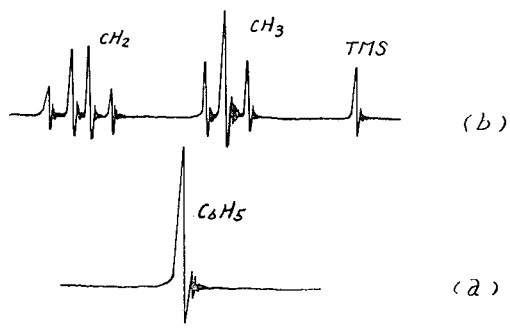

According to this method the modulation range is divided into two equal parts or more according to the number of modulation frequencies. FIG. 3 shows the resonance spectrum lines of ethylbenzene ($C_6H_5CH_2CH_3$) to which tetramethyl silane (TMS) has been added for reference. The spectrum A-C is divided into two equal parts (A-B) (B-C) and the magnetic field or frequency corresponding to each part is swept simultaneously. That is to say, the magnetic field or frequency corresponding to (A-B) is swept by $\omega_{m1}$ and the magnetic field or frequency corresponding to (B-C) is swept by $\omega_{m2}$. The resultant resonance spectrum lines of the two halves of the spectrum, i.e., (A-B) and (-C), appear as shown in FIGS. 4($a$) and ($b$) respectively.

In accordance with this method, therefore, the entire spectrum is observed in half the time necessary for conventional sweep. Moreover, by using more than two modulation frequencies, the measuring time can be reduced. Again, since when observing unknown samples the position of the spectra are unknown, it is very advantageous to shorten the sweep time by applying the above-mentioned method.

METHOD TWO

Figure 5:
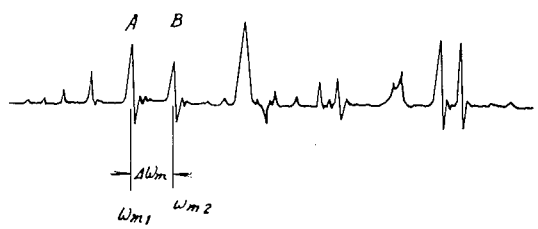
FIG. 5 is a graphical illustration of the spectrum used for explaining the modified embodiment according to FIG. 6.

According to this method two modulation frequencies are set very close to each other, but not so close as to cause interaction between the two phase detectors. By making the difference $\Delta\omega_m$ between modulation frequencies $\omega_{m1}$ and $\omega_{m2}$ comparatively small, $\omega_{m1}$ resonates at spectrum A and $\omega_{m2}$ resonates at spectrum B, as shown in FIG. 5. As a result, each resonance signal is fed into the phase detectors 19 and 20, respectively, as shown in FIG. 6. At the same time, $\omega_{m1}$ and $\omega_{m2}$ are applied to the phase detectors as reference signals. Each resonance frequency component is introduced into a computer 24 via A-D (analog to digital) converters 22 and 23. Once in the computer, the output from the A-D converter 23 is shifted by $\Delta\omega_m$ and thereafter added to the output from the A-D converter 22. Thus, the accumulated signals are indicated on the recorder 21.

By means of this method, the signal intensity is twice that of the conventional method and the noise component becomes $\sqrt{2}$, so that the S/N ratio increase to $\sqrt{2}$. This method is very advantageous because the S/N ratio can be improved by setting the modulation frequencies $\omega_{m1}$ and $\omega_{m2}$ very close together, even though the measuring time is almost equal to that of the conventional method using one modulation frequency. Moreover, it goes without saying that to use more than two modulation frequencies would be even more effective for improving the S/N ratio.

METHOD THREE

According to this method, simultaneous ordinal and partially magnified measurements are made. When it is desired to observe the whole spectrum and a desired part of the spectrum simultaneously, the modulation frequencies $\omega_{m1}$ and $\omega_{m2}$ are set so that $\omega_{m1}$ sweeps the whole spectrum and $\omega_{m2}$ sweeps the said desired part of the spectrum with the same measuring time, that is, at different sweep rates. In accordance with this method, the spectra are obtained as shown in FIG. 7 where FIG. 7($a$) shows the spectra of the entire spectrum and FIG. 7($b$) shows the magnified spectra of $CH_3$.

Figure 8:
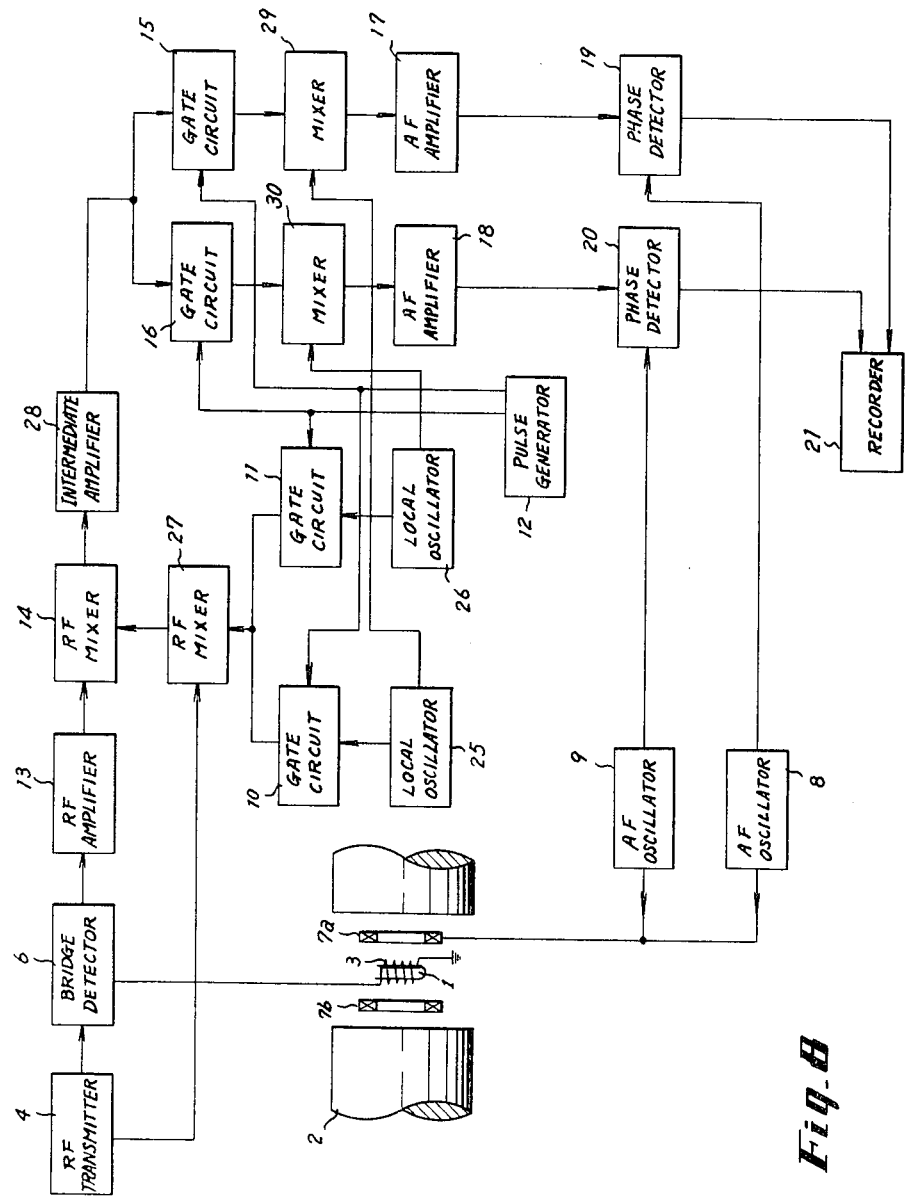
FIG. 8 shows another embodiment of this invention.

FIG. 8 which utilizes the same units as FIG. 1, shows the block diagram of another embodiment of the gyromagnetic resonance spectrometer system utilizing the time sharing technique designed in accordance with the present invention.

METHOD FOUR

This invention is applicable to the invention described in the U.S. Pat. No. 3,462,676, filed Nov. 29, 1966, describing a Method For Producing Gyromagnetic Resonance. This patent disclosed a method for effectively obtaining and measuring the resonance of nuclei such as $^{13}C$, $^{31}P$, $^{19}F$ and protons which are adjacent to paramagnetic metals, all the said nuclei being characterized by their larger chemical shifts. The patent utilizes the nuclear resonance single sideband method (NSS System) in order to measure the resonance signal of a sample having a large chemical shift.

In the embodiment as shown in FIG. 8, modulation frequencies $\omega_{m1}$ and $\omega_{m2}$ (for example, 4 kHz. and 5 KHz.) are simultaneously and continuously applied to the modulation coils 7$a$ and 7$b$. The RF driving field is selected so as to give the optimum resonance condition at the first sideband ($n=1$) in order to saturate the main band at $n=0$. The resonance signals of the sample 1 are produced by sweeping the unidirectional magnetic field and are fed into an RF amplifier 13 through a bridge detector 6. The output signals from the RF amplifier are transmitted to a mixer 14 to which different radiofrequencies are alternately applied from local oscillators 25 and 26 through gate circuits 10 and 11 and a mixer 27. The output signals of the local oscillators are, for example, 459 kHz. and 460 kHz. Since the outputs of pulse generator 12 applied to the said gate circuits are in antiphase, the outputs from the local oscillators 25 and 26 are alternately applied to the mixer 27 to which the RF driving field $f_t$ (60 mc.) is simultaneously supplied from the RF transmitter 4. The output signals $f_t\pm459$ kHz. and $f_t\pm460$ kHz. from the mixer 27 are then alternately fed into the mixer 14. Mixer 14 mixes the signals fed from the RF amplifier 13 with the $f_t\pm459$ kHz. and $f_t\pm460$ kHz. signals resulting in output signals having frequency components 459 KHz.$\pm4$ kHz. and 460 kHz.$\pm5$ kHz. These components are then transmitted to an intermediate frequency amplifier 28 provided with a crystal filter having a very narrow band-pass width. 455 kHz. is now set as the center frequency. The output signals, 459−4 kHz. and 460−5 kHz., are selected by the crystal filter and then fed into gate circuits 15 and 16 to which pulses are supplied from the pulse generator 12. These gate circuits operate in the same way as the gate circuits 10 and 11. The outputs passed through the gates 15 and 16 are fed into mixers 29 and 30 to which the local oscillator signals 459 kHz. and 460 kHz. are applied as reference signals, respectively. The output signals, each having only one component 4 kHz. and 5 kHz., are selected from the said mixer 29 and 30, and are then introduced into phase detectors 19 and 20 via audiofrequency amplifiers 17 and 18, respectively. At the same time, the audiofrequency oscillators 8 and 9 apply reference signals $\omega_{m1}$ and $\omega_{m2}$ to the said phase detectors respectively.

Thus, by setting the reference signals to 0° or 90° by means of a phase shifter (not shown) either the dispersion mode or absorption mode can be optionally selected and recorded. The resultant spectra are shown in FIG. 9 ($a$) and ($b$).

With the above embodiment utilizing the NSS System, the different resonance regions can be observed simultaneously by applying two or more different modulation frequencies and by alternately and continuously applying two or more different local oscillator frequencies, corresponding to the said two or more different modulation frequencies, to a mixer.

Moreover, in order to improve the S/N ratio, the A-D converters and computer can be arranged as shown in FIG. 6.

Although the present invention describes the utilization of a magnetic field modulation-type gyromagnetic resonance apparatus, other types of gyromagnetic resonance apparatus, for example, the radiofrequency magnetic field modulation-type apparatus may be utilized in lieu. In other words, it is not limited to one type of apparatus.

This invention may be also used with either an internal or external control sample system.

The invention as described above can also be applied to a proton magnetic resonance spectrometer without any change or modification.

In the specification and claims, by substantially simultaneously we mean intermittently over short intervals as determined by the frequency of the pulse generator.

While we have shown and described preferred embodiments of our invention, other modified embodiments within the scope of the appended claims may be applied.

We claim:

1. A nuclear magnetic resonance spectrometer for measuring gyromagnetic resonance in a sample comprising:
   a. means for positioning the sample in a unidirectional magnetic field,
   b. means for producing the unidirectional magnetic field for polarizing said sample,
   c. means for applying a driving radiofrequency magnetic field to said sample at right angles to said unidirectional magnetic field so as to produce gyromagnetic resonance in said sample,
   d. means for modulating one of said unidirectional or radiofrequency magnetic fields applied to the sample with at least two different frequencies,
   e. means for substantially simultaneously detecting the respective resonance signals corresponding to said different modulation frequencies,
   f. gate circuits for alternately applying said different modulation frequencies to said sample,
   g. means in synchronism with said gate circuits for alternately selecting one resonance frequency component from the respective resonance signals based on the different modulation frequencies, and
   h. means for recording said respective resonance signals.

2. A nuclear magnetic resonance spectrometer for measuring gyromagnetic resonance in a sample according to claim 1 comprising:
   means for accumulating the resonance signals, the said accumulating means shifting one of the resonance signals by only the difference between the modulation frequencies and then accumulating the shifted resonance signal and the remaining resonance signal, whereby the signal to noise ratio is improved.

3. A nuclear magnetic resonance spectrometer for measuring gyromagnetic resonance in a sample comprising:
   a. a sample positioned in a unidirectional magnetic field,
   b. means for producing the unidirectional magnetic field for polarizing said sample,
   c. means for applying a driving radiofrequency magnetic field so as to produce gyromagnetic resonance in said sample,
   d. means for simultaneously modulating said unidirectional magnetic field with at least two different modulation frequencies,
   e. means for detecting the respective resonance signals corresponding to said different modulation frequencies,
   f. local oscillators for producing at least two different radiofrequencies corresponding to the said at least two different modulation frequencies,
   g. first gate circuits for alternately and continuously passing said different radiofrequencies,
   h. means for mixing resonance signals in said sample with the alternately and continuously passed different radiofrequencies, in order to obtain the intermediate frequency resonance signal components,
   i. a means for filtering these said intermediate frequency resonance signal components in such a manner as to select only one sideband frequency component at a time corresponding to each respective modulation frequency,
   j. second gate circuits for alternately and continuously passing the said band frequency components,
   k. means for heterodyne detection wherein the respective output signals from the second gate circuits and radiofrequencies from the local oscillators are mixed and heterodyne detected so as to simultaneously detect only the respective audiofrequency resonance signals, and
   l. means for recording said respective resonance signals.

4. A nuclear magnetic resonance spectrometer for measuring gyromagnetic resonance in a sample according to claim 3 comprising:
   a. means for accumulating the resonance signals, the said accumulating means shifting one of the resonance signals by only the difference between the modulation frequencies and then accumulating the shifted resonance signal and the remaining resonance signal in order to improve the S/N ratio, and
   b. means for recording the resonance signals.

5. A method for measuring gyromagnetic resonance on the nuclear magnetic resonance spectrum comprising the steps for:
   a. applying a unidirectional polarizing magnetic field to the sample,
   b. applying a driving radiofrequency magnetic field to the sample at right angles to said unidirectional magnetic field,
   c. simultaneously modulating said unidirectional magnetic field with at least two different modulating audiofrequencies, thereby producing at least two resonance regions on the gyromagnetic spectrum in which resonance signals occur,
   d. detecting signals from the sample when it is at resonance in any resonance region,
   e. alternately mixing the resonance signals with local frequency signals selected to permit mixed signals corresponding to any one resonance signal to pass a narrow band filter,
   f. passing the mixed signals through a narrow band filter,
   g. mixing the filtered signal with the local frequency signal which enables it to pass the filter to obtain an audiofrequency signal,
   h. passing the signal to a phase detector to which the respective audio modulating frequency is simultaneously fed, and
   i. alternately recording the resonance in the different resonance on the gyromagnetic spectrum.

6. A method for measuring gyromagnetic resonance over the nuclear resonance spectrum in a sample comprising the steps for:
   a. applying a unidirectional polarizing magnetic field to the sample,
   b. applying a driving radiofrequency magnetic field to said sample at right angles to said unidirectional magnetic field,
   c. modulating one of said unidirectional magnetic field or radiofrequency fields applied to said sample with at least two different frequencies to create two different resonance regions on the gyromagnetic spectrum, said different frequencies being alternately applied,
   d. selecting one resonance frequency component from the respective resonance signals based on the different modulating frequencies, and
   e. observing substantially simultaneously the selected resonance signals corresponding to the different modulating frequencies and recording the respective resonance signals.

* * * * *

UNITED STATES PATENT OFFICE
CERTIFICATE OF CORRECTION

Patent No. 3,646,429        Dated February 29, 1972

Inventor(s) Makoto Takeuchi et al.

It is certified that error appears in the above-identified patent and that said Letters Patent are hereby corrected as shown below:

> In the Abstract - Line 3
> --ratio-- should read --radio--.
> Column 3 Line 14 --(-C)-- should read
> --(B-C)--. Column 4 Line 1 --larger--
> should read --large--.

Signed and sealed this 11th day of July 1972.

(SEAL)
Attest:

EDWARD M. FLETCHER, JR.       ROBERT GOTTSCHALK
Attesting Officer              Commissioner of Patents